(12) United States Patent
Tuck, III et al.

(10) Patent No.: US 7,103,046 B2
(45) Date of Patent: *Sep. 5, 2006

(54) METHOD AND APPARATUS FOR INTELLIGENT SORTING AND PROCESS DETERMINATION OF DATA PACKETS DESTINED TO A CENTRAL PROCESSING UNIT OF A ROUTER OR SERVER ON A DATA PACKET NETWORK

(75) Inventors: Russell R. Tuck, III, San Jose, CA (US); Puneet Agarwal, San Francisco, CA (US)

(73) Assignee: Pluris, INC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/845,660

(22) Filed: May 14, 2004

(65) Prior Publication Data
US 2004/0208178 A1    Oct. 21, 2004

Related U.S. Application Data

(63) Continuation of application No. 09/935,433, filed on Aug. 22, 2001, now Pat. No. 6,738,378.

(51) Int. Cl.
H04L 12/28    (2006.01)

(52) U.S. Cl. .................. 370/392; 370/401; 709/240

(58) Field of Classification Search ............... 370/401, 370/412, 392, 466; 709/105, 230, 220, 240; 710/100
See application file for complete search history.

(56) References Cited

U.S. PATENT DOCUMENTS

| 6,144,669 | A  | * | 11/2000 | Williams et al. | 370/401 |
| 6,327,243 | B1 | * | 12/2001 | Gregorat | 370/218 |
| 6,577,600 | B1 | * | 6/2003 | Bare | 370/238 |
| 6,738,378 | B1 | * | 5/2004 | Tuck et al. | 370/392 |

OTHER PUBLICATIONS

U.S. Appl. No. 09/935,433, Tuck, III et al.

* cited by examiner

*Primary Examiner*—Duc Ho
(74) *Attorney, Agent, or Firm*—Donald R. Boys

(57) ABSTRACT

In a network node having one or more packet processors and at least one CPU required to process specific types of packets, a system for managing the specific types of packets for CPU processing has one or more packet processors enabled to sort the specific types of packets into two or more categories of different priority for processing; and a queue set for queuing the sorted packets according to priority ahead of the CPU. The system is characterized in that the CPU processes the queued packets according to priority. In a special case the queues are a part of network access controller (NAC). Also in some cases a software component is provided for configuring the hardware.

11 Claims, 3 Drawing Sheets

METHOD AND APPARATUS FOR INTELLIGENT SORTING AND PROCESS DETERMINATION OF DATA PACKETS DESTINED TO A CENTRAL PROCESSING UNIT OF A ROUTER OR SERVER ON A DATA PACKET NETWORK

CROSS-REFERENCE TO RELATED DOCUMENTS

The present application is a continuation application of patent application Ser. No. 09/935,433 entitled "Method and Apparatus for Intelligent Sorting and Process Determination of Data Packets Destined to a Central Processing Unit of a Router or Server on a Data Packet Network," filed Aug. 22, 2001 now U.S. Pat. No. 6,738,378, which is incorporated in its entirety by reference.

FIELD OF THE INVENTION

The present invention is in the field of routing digital data over a data-packet-network (DPN) and pertains more particularly to methods and apparatus for intelligent process determination of data packets encountered by a router CPU during router operation.

BACKGROUND OF THE INVENTION

In the art of routing digital data through data-packet networks, research and development of methods for more efficient handling of data packets continues. Generally speaking, a data packet is a digitized and organized block of binary data that is a "packaged" portion of a specific communication or data transfer from a source location to an ultimate destination on a network. A data packet typically has a header, and a data body. The packet header is used for data routing through the network. During routing from a source location to a routed destination, data packets may be processed at one or more stops or routing points along the way. These hops, as they are often termed, are between data routers and, in some cases, server nodes distributed through the network. Common types of data packets routed, for example, over the Internet network and most commonly dealt with in data routing include transfer control protocol (TCP) packets and Internet protocol (IP) data packets.

Among TCP packets there are packets carrying data and also others carrying other information such as error messages, and control messages. Some TCP packets are generated by routers and communicated to other routers, as well as generated by routers and communicated to source/destination locations other than routers. TCP communication is a substantial part of all network communication or load.

It will be appreciated by the skilled artisan that many TCP and IP data packets comprising router-to-router communications and internal router communications are generated in the network and are destined for a central processing unit adapted to process them. For example, router-to-router communications, such as request and response messages related to routing are prevalent. Error packets related to control errors and the like are also prevalent.

Prior-art data routers typically utilize a central processing unit (CPU), which is separate from the router's data packet processor or processors in order to process error messages, control messages, and data packets that for some reason require special handling. A network access controller (NAC) is (typically) hardware that reads and routes CPU-destined data packets to the router CPU for processing.

In some instances, CPU-destined data packets are corrupted packets or damaged packets. Still other CPU-destined packets are addressed to the router by another router or computer. In some cases these are fraudulent data packets purposely and repeatedly generated and sent to a network destination (CPU) with the mission being to compromise the CPU of the destination machine. Computer network hackers, working alone or in conjunction with others have been known to launch such attacks, wherein an overload of erroneous data is generated and routed to a single point in the network for processing, causing that point to fail from CPU overload. One common form of attack is known in the art as a denial-of-service (DOS) attack wherein repeated requests are sent to one network location, causing the location to overload while processing and responding to all of the requests.

A problem with prior art CPU handling of data packets is that the CPU has no means of determining priority in packet handling. For example, all packets directed thereto by a NAC are processed on a first-come, first-processed basis. There is no method of sorting good packets from bad packets or sorting packets by the type of request they carry. This problem has led to occurrences of failure for routers and, in many cases, loss of traffic to network servers connected in their paths. In some cases servers themselves are targeted. In the case of an attack on a router, the affected router may fail or become compromised as the CPU works in overload conditions to process all of the erroneous or spurious data sent. Moreover, a server connected to that router may suffer lack of data traffic due to failure of the router in front of it.

What is clearly needed is a method and apparatus that enables a router or server to quickly identify and sort data packets that require special handling by category and priority so that the CPU is able to adequately process legitimate and useful packets, even in the presence of an overload of erroneous or spurious packets.

SUMMARY OF THE INVENTION

In a preferred embodiment of the invention, in a network node having one or more packet processors and at least one CPU required to process specific types of packets, a system for managing the specific types of packets for CPU processing is provided, the system comprising one or more packet processors enabled to sort the specific types of packets into two or more categories for processing, and a queue set for queuing the packets according to category. The system is characterized in that the CPU processes the queued packets according to category.

In some embodiments the queues into which the specific packets are sorted are hardware components of a network access controller (NAC). Also in some embodiments the network is the Internet network. The network node may be one of a packet router, a computer, or an information server, wherein the network is the Internet network. There may further be a software component for monitoring CPU load, and for configuring the system to select from the queues for processing according to a scheme considering the CPU load. In some embodiments the queues are assigned priorities and the CPU always processes the highest level of priority regardless of CPU load. In other embodiments each queue can be assigned a rate limit and the CPU observes this limit so that CPU resources are available for the other queues.

In another aspect of the invention a network data router capable of categorizing data packets for CPU processing is provided, the router comprising at least one data port for sending and receiving data, at least one packet processor, and a queue set of two or more queues for managing packets destined to the CPU for processing. The router is characterized in that the at least one packet processor sorts packets destined for processing according to two or more categories or priorities into the two or more queues, and the CPU takes from queues for processing.

In some embodiments the queues into which the specific packets are sorted are hardware components of a network access controller (NAC), and also in some embodiments the network is the Internet network.

In some embodiments of the router there may be a software component for monitoring CPU load, and for configuring the system to select from the queues for processing according to a scheme considering the CPU load. Also in some embodiments the queues may be assigned priorities and the CPU will always process the highest level of priority regardless of CPU load. Further, in some embodiments each queue can be assigned a rate limit and the CPU observes this limit so that CPU resources are available for the other queues.

In still another aspect of the invention a method for processing CPU-destined data packets in a network node, the node having at least one data port for sending and receiving data, and at least one packet processor coupled to the node is provided, comprising steps of (a) receiving data packets at the data port, (b) determining those packets to be sent to the CPU for processing, (c) sorting the CPU-destined packets into two or more queues by category, and (d) selecting packets from the queues for CPU.

In some embodiments of this method, in step (c), the queues into which the specific packets are sorted are hardware components of a network access controller (NAC), and network may be the Internet network. The network node may be one of a packet router, a computer, or an information server.

In other preferred embodiments there may be a step for configuring the queues and setting a selection protocol for processing by a software component executing on the network node. There may be a software component for monitoring CPU load, and for configuring the system to select from the queues for processing according to a scheme considering the CPU load. In some cases each queue has an associated priority and the CPU always processes the highest level of priority regardless of CPU load. In other cases of the method each queue can be assigned a rate limit and the CPU observes this limit so that CPU resources are available for the other queues.

In embodiments of the invention, described in enabling detail below, method and apparatus is provided that makes it possible for the first time to categorize packets received at a network node and destined for a CPU, and to exercise discretion in how those packets are managed and processed.

BRIEF DESCRIPTION OF THE DRAWING FIGURES

DESCRIPTION OF THE PREFERRED EMBODIMENTS

Figure 1:
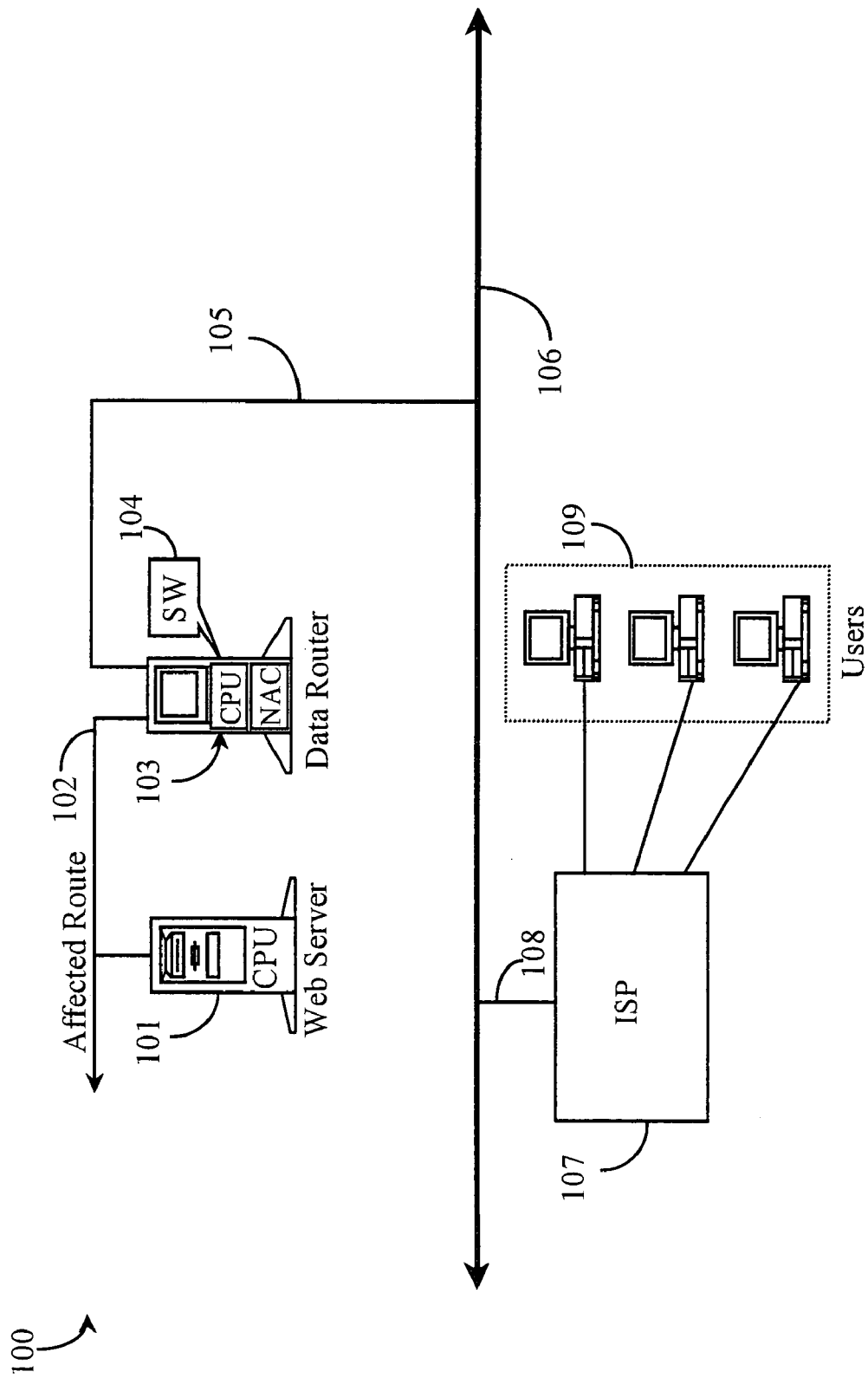
FIG. 1 is an architectural overview of a communication network wherein data is routed and processed according to an embodiment of the present invention.

FIG. 1 is an architectural overview of a communication network 100 wherein data is routed and processed according to an embodiment of the present invention. Communication network 100 is, in a preferred embodiment, the well-known Internet network. However in other embodiments, network 100 may be a private or corporate wide-area-network (WAN), an Ethernet, an Intranet or any other data packet network (DPN) that supports such as TCP and IP protocol. The inventor chooses the Internet in this example because of its high public-access characteristic.

Network 100 is supported by an Internet backbone 106, which comprises all of the equipment, lines and access points making up the Internet network as a whole. Therefore there are no geographic limitations to the practice of the present invention. A grouping 109 of PC users is illustrated as a plurality of PC icons enclosed within a dotted rectangle in this example. Users 109 represent any standard entity having network-access capability by way of computer or any other network-capable device. In this example, users 109 are illustrated as connected to an Internet Service Provider (ISP) 107. ISP 107 is a local ISP in this example servicing users 109 through the well-known public-switch-telephone-network. (PSTN) as is known in the art. The PSTN network or equipment known to be present therein are not illustrated but may be assumed to be present. Users 109 may also connect to ISP 107 through a private telephone network, by wireless methods and apparatus, by direct connection such as Ethernet or SONET, or by any other mechanism without departing from the spirit and scope of the present invention.

ISP 107 has connection to backbone 106 by way of an Internet access line 108 for enabling network connections on behalf of users 109. Connection equipment such as modem banks and connection servers are not illustrated within ISP 107 but may be assumed to be present. ISP 107 is adapted to provide Internet service to users 109.

A network data router 103 is provided within network 100 and adapted to route digital data traveling through network 100. Router 103 has connection to backbone 106 by way of path 105. A web server 101 is also illustrated within network 100 and is adapted as a file server, which serves data upon user request. Server 101 may store and serve web pages created in hypertext markup language (HTML), or any other known network mark-up language of which there are several. In one embodiment server 101 may be adapted to serve e-mails or other messaging media. In still another application, server 101 may be a media server serving video and audio IP data. There are many possibilities. Server 101 and Router 103 are meant to represent the very large number of such routers and servers in the Internet network.

In this example, server 101 is connected "downstream" from and in line with router 103 along a network line or path 102. There may also be more servers and routers in this example without departing from the spirit and scope of the present invention. The inventor illustrates one of each and deems such illustration sufficient for the purpose of describing the present invention in enabling detail.

In this specific example, users 109 may interact with web server 101 only through router 103. That is to say that data sent to or received from server 101 with respect to users 109 sending or receiving the data is routed through router 103. In actual practice there may be many paths to server 101 as well as many routers connected along those paths. However, to illustrate the invention in a simple embodiment only one routing path is illustrated.

Users 109 may singly or as a group launch network attacks against server 101 or against router 103. Such attacks as described with reference to the background section would presumably be for the purpose of compromising router 103 or server 101, or both.

It is illustrated in this example that each of server 101 and router 103 has a CPU for performing data processing and control functions. For the purpose of clear description, consider an attack on router 103. An attack on router 103 targets the CPU of that router. In prior art, and in embodiments of the present invention, the router has a NAC that routes CPU-destined data packets coming into router 103, in this case over path 105, directly to the CPU wherein the CPU must process the data on a first-in basis. The NAC in embodiments of the present invention is enhanced in a unique way over such controllers in the prior art.

Generally speaking, there are three categories of CPU-destined data that are considered in a preferred embodiment of this invention. These are data packets from known and trusted data sources, data packets from data sources known to be suspect, and data packets falling between the first two categories. Data packets from known and trusted data sources include legitimate and legal packets from neighboring routers and secure nodes, as well as internally generated data packets. Data packets from sources that are suspect include those from sources known within the network to have previously caused damage to network components.

In prior art conventions are available for dealing with known sources of malicious data including illegitimate data packets that are not identified as data packets, that would, by their nature, lead to proper service by a CPU of a data router. These packets, if detected, may be dropped before being routed to a CPU. However, malicious hackers strive to construct data that appears legitimate and therefore may pass conventions designed to prevent such data from being routed to the CPU. Additionally, data that is legitimate but not known to be from a trusted source or from a malicious source should, of course, be processed. As was described with reference to the background section, all data packets entering the CPU are processed on a first-in basis. If malicious data packets enter the CPU for processing, an attack may be successful in compromising the data router.

In a preferred embodiment of the invention a mechanism is provided including both hardware and software for dealing with data packets destined to be CPU-processed. In this innovation the network access controller (NAC) is enhanced with hardware components to separate packets in queues according to types and categories as described briefly above. That is, one queue may be implemented for packets determined to be from known and trusted sources, another for packets determined to be from suspect sources, and a third for packets that fall between these two categories; which would be for packets that seem in every way to be legitimate, but can not be confirmed to be from a trusted source or to be from a known spurious source.

In this preferred embodiment priority for processing by the CPU is assigned, with the highest priority for the queue holding the trusted packets, and the lowest priority for the queue holding the packets highly suspect. In one alternative highly suspect packets are simply dropped, and queues are made and kept for packets that can be categorized sufficiently.

In other embodiments of the invention packets may be grouped by type of operation, and the queues serviced at a preferred rate, so one type of packet doesn't squeeze out another type. Alternatively packets could be grouped by both type and source. In this embodiment it needs to be remembered that the source address can be forged, so grouping by source might not always be reliable, or only reliable for a few sources where forging can be detected elsewhere by other means.

The different ways that packets might be queued in various embodiments of the invention may require different numbers of queues. In various embodiments the method by which the CPU may take packets for processing may vary as well.

SW 104 in a preferred embodiment is enabled to configure the hardware implemented in the unique NAC to sort and provide packets to the CPU in a variety of ways, described in more detail below.

Figure 2:
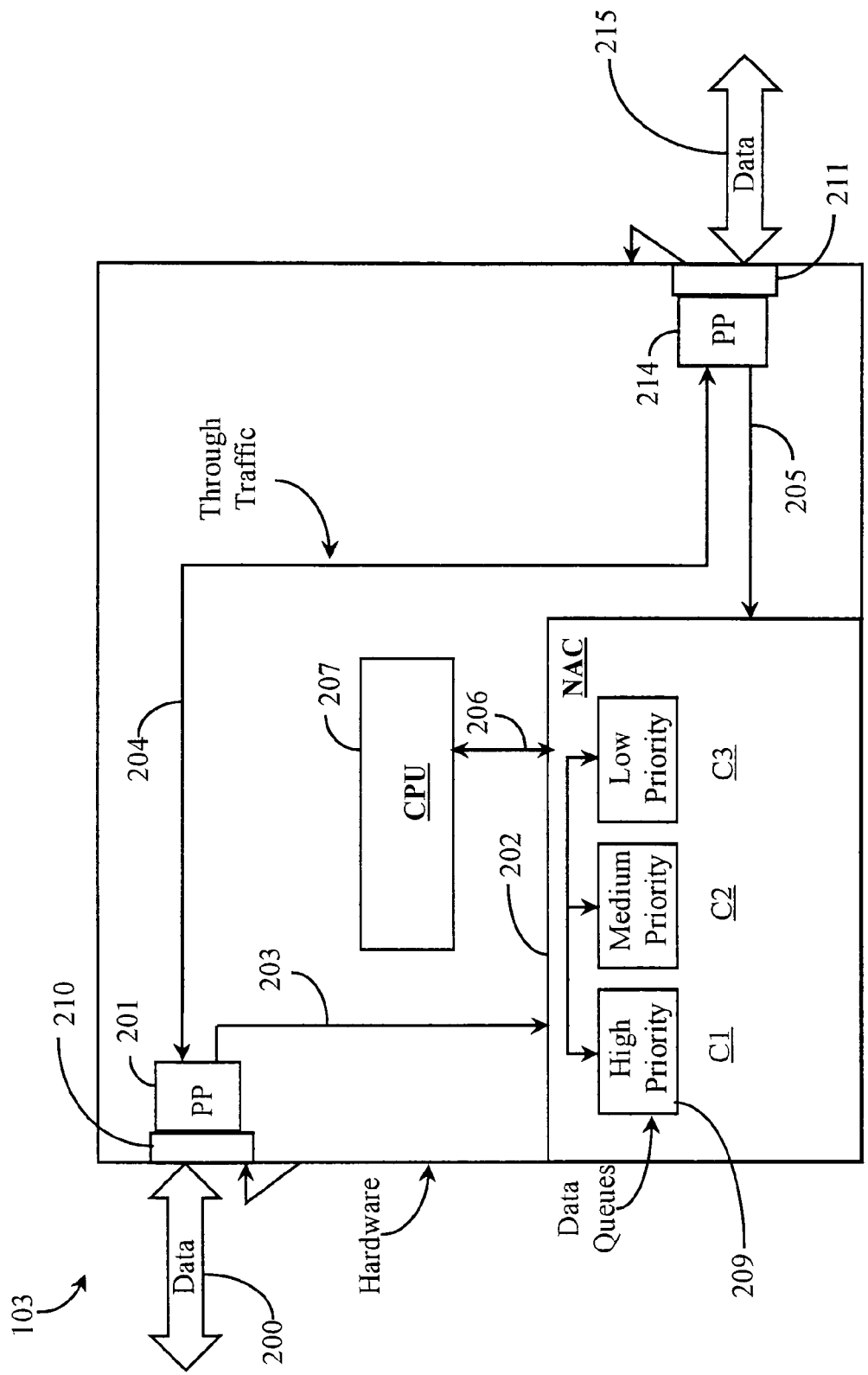
FIG. 2 is a block diagram illustrating internal function of the data router of FIG. 1.

FIG. 2 is a block diagram illustrating certain internal components and functions of data router 103 of FIG. 1. Data router 103 has at least two ports for receiving and sending data in this example. These are ports 210 and 211. Block arrows 200 and 215 associated with ports 210 and 211 respectively illustrate bi-directional data entering and leaving router 103. A through-traffic path 204 is illustrated as a line connection between ports 210 and 211. Data not destined for CPU processing will pass through data router 103 without significantly involving a CPU of the router illustrated herein as CPU 207. This is not meant to imply that no processing occurs on through packets. Each port 210 and 211 has a packet processor (PP) associated therewith for processing, in particular, data-carrying packets. It is noted herein that line cards having data ports may be present within data router 103, although not illustrated. Other cards may be used in implementing an internal router fabric of router 103 and my send and receive internal messages to and from CPU 207. It may be assumed that such cards may be in many embodiments a part of the logically illustrated path 204.

PP 201 resides at the location of port 210 and a PP 214 resides at the location of port 211 in this example. PP 201 and PP 214 are adapted to read and determine the nature of incoming data packets to router 103, such that they may be categorized and sorted, if destined for the CPU, or processed directly if not. PP 201 and PP 214 are illustrated in-line with ports 210 and 211, and may be assumed to be integrated with port circuitry. NAC 202 is provided and adapted to route CPU-destined packets, and to separate such packets into prioritized queues, in an embodiment of the present invention, according to category and class. NAC 202 is illustrated as logically connected for to both port 210 and 211, through the respective associated PPs, by a communication path 203 to port 210 and by a communication path 205 to port 211.

Packets destined for CPU 207 are sent thereto by NAC 202 over a logical data path 206 from any one of three queues 209, labeled C1, C2 and C3 in this example. Data packets destined for CPU 207 are deposited into an appropriate one of the three queues by PPs 201 and 214, depending upon which port receives the packets.

In this embodiment three hardware queues are provided in NAC 202, one for high priority, one for intermediate priority and one for low priority. In this embodiment sorting into queues is done according to trusted, distrusted, or uncertain packets as described above.

In a preferred embodiment, SW 104 as an enhancement is enabled to configure the new queue hardware in NAC 202, providing an interface for configuring the queuing system, such as which and how many queues will be used, what the priority is to be, and the method by which packets are selected from each queue for the CPU. In practice of the present invention, CPU 207, given enough resources, processes packets from all of the categorical subclasses C1, C2, and C3. However, when resources begin to become more scarce, that is, during high traffic periods, CPU 207 will prioritize by continuing to process data in C1, perhaps C2, but will begin to ignore C3, letting data queues become full and allowing discard of any additional data packets attempting to enter. As CPU resources become further taxed, CPU 207 will begin to ignore the C2 queue allowing that queue as well to fill to a point where additional data packets are discarded. Under this extreme condition CPU 207 prioritizes and continues to process all data packets in queue C1, which has the highest priority.

In an alternative embodiment CPU resources may be monitored using threshold points for triggering CPU prioritization. Threshold points can be based on any reasonable load determination. As a further variant, each queue might be serviced at a minimum rate, and then high priority queues would be serviced with whatever CPU resources remain. In other words, even when the CPU can't keep up, it could still do some processing for each queue.

It will be apparent to one with skill in the art that there may be more or fewer categories, other ways of categorizing packets, and other methods of scheduling and allocating CPU resources than are illustrated in this example without departing from the spirit and scope of the present invention. If a sophisticated attack on router 103 were to occur, such that all of the data packets involved in the attack are queued in data queues organized under C2, for example, CPU load would rise dramatically while processing those packets. The load increase then reaches a threshold designed to cause CPU 207 to begin ignoring or discarding some or all of those packets. In this way, CPU 207 of data router 103, and by implication, the router itself is protected from overload. It is able to continue servicing other categories of packets at reasonable rates.

Figure 3:
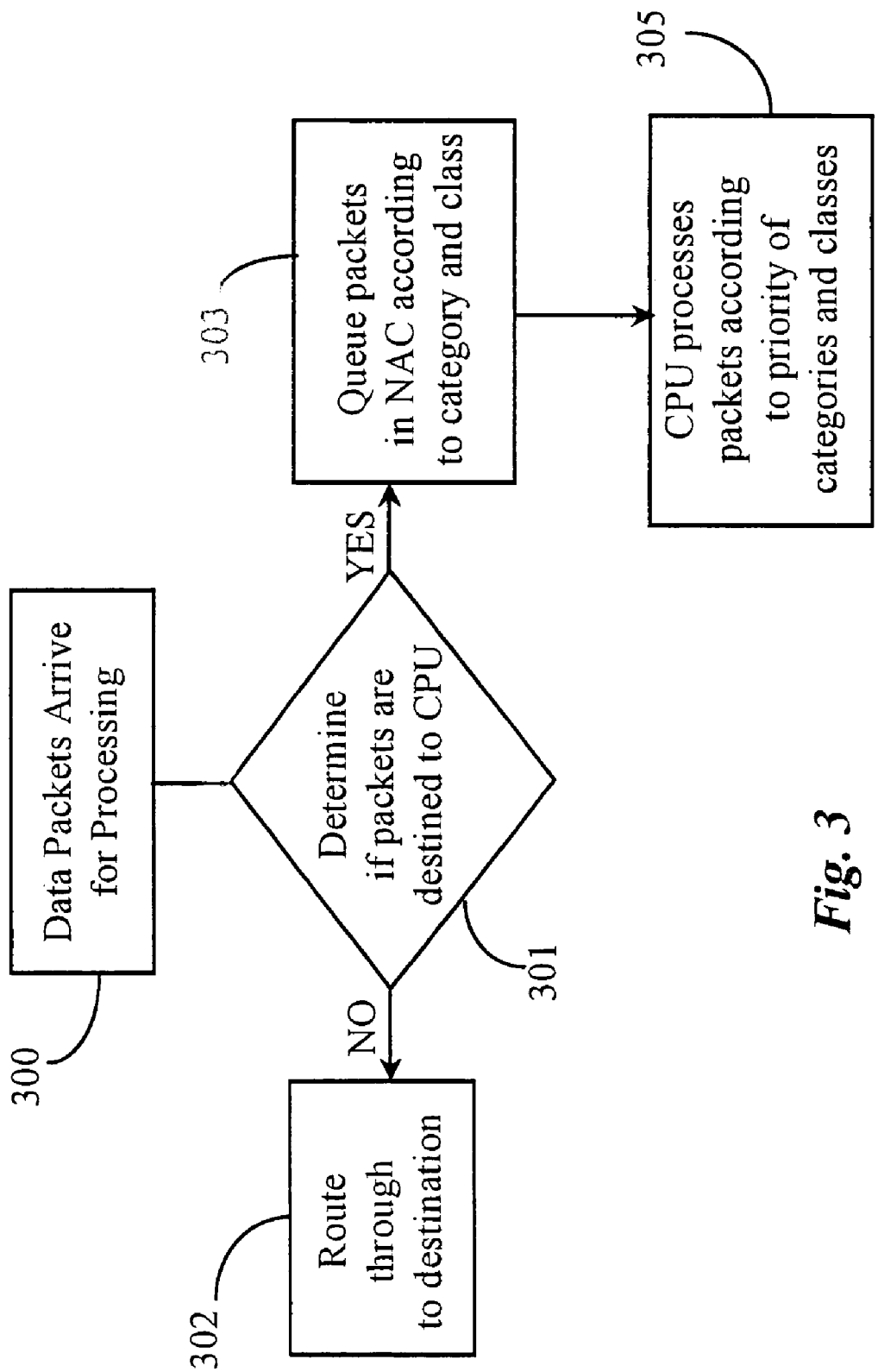
FIG. 3 is a process flow diagram illustrating system steps for practicing the present invention according to an embodiment of the present invention.

FIG. 3 is a process flow diagram illustrating system steps for practicing the present invention according to a preferred embodiment. At step 300, data packets arriving at ports (210, 211 FIG. 2) are processed according to packet header information. At step 301, a determination is made if processed packets are destined to the CPU. The CPU-destined packets are transmitted to the appropriate queues in NAC 202 (FIG. 2).

Packet processors as described with reference to FIG. 2 above perform steps 300 and 301. If it is determined that incoming data packets are not destined for CPU processing, then at step 302 they are routed through to destinations. However, if it is determined that the packets in question are destined for CPU processing, then at step 303 the data packets are queued accordingly.

At step 305, the CPU processes packets according to priority of category and class contingent on load threshold and capacity of CPU under current network and data traffic conditions, as configured by software 104. As CPU load increases toward capacity limits, then more and more of the lower priority data queues are ignored until the CPU is only processing C1 data, which is the highest priority. As CPU load again decreases in relation to capacity, previously ignored queues will begin to be used for processing again. Again, the load thresholds and the scheme under which packets are selected from queues under different load conditions for processing by the CPU can be anything reasonable.

The method and apparatus of the present invention is not limited to data routers. In one aspect, a web server analogous to server 101 of FIG. 1 may be enhanced with a version of SW 104 (FIG. 1) and queues equivalent to queues 209. The method and apparatus of the present invention may be practiced on the Internet and any sub-networks connected thereto as well as Ethernets, Intranets, and corporate or private WANs. Therefore the method and apparatus of the present invention should be afforded the broadest possible scope under examination. The spirit and scope of the present invention is limited only to the language of the claims that follow.

What is claimed is:

1. A system for managing packets on a data network comprising;
   a network node having one or more packet processors enabled to sort specific types of packets into categories for processing;
   a network access controller (NAC) operating in the node;
   a queue set for receiving processed packets from the NAC; and
   a CPU for pulling packets for processing from the queue set;
   wherein the packet processors provide enhanced security in the network by categorizing incoming packets destined for the CPU into three or more categories, being at least one category for packets received from known, trusted sources, one category for suspect sources, and one category for packets received from unsure sources and forwards the categorized packets to the queue set and the CPU pulls packets for processing from the queue set according to a priority listing of the categories.

2. The system of claim 1 wherein the priories set for the categories are highest, lowest and intermediate, respectively.

3. The system of claim 1, wherein the network is the Internet network.

4. The system of claim 1, wherein the network node is one of a packet router, a computer, or an information server.

5. The system of claim 1, wherein the network is the Internet network.

6. A method for processing CPU-destined data packets in a network node, comprising the steps of;
   (a) providing a CPU in the node for receiving and processing incoming packets from the network;
   (b) providing a network access controller (NAC) in the node;
   (c) processing incoming packets destined for the CPU into three or more categories, the categories consisting of known, trusted sources; suspect sources and unsure sources, thereby providing enhanced security in the network;
   (d) queuing the categorized packets into a queue set; and
   (e) pulling the packets from the queue set by the CPU for processing according to a priority listing of the categories.

7. The method of 6 wherein the priories set forte categories in step (c) are highest, lowest and intermediate, respectively.

8. The method of claim 7, wherein the CPU always processes the highest level of priority regardless of CPU load.

9. The method of claim 6, wherein the network is the Internet network.

10. The method of claim 6, wherein the network node is one of a packet router, a computer, or an information server.

11. The method of claim 10, wherein the network is the Internet network.

* * * * *